(No Model.) 2 Sheets—Sheet 1.

H. N. WAYNE.
ENDLESS TUBULAR FABRIC.

No. 552,940. Patented Jan. 14, 1896.

Witnesses
C. C. Stecher
Arthur J. Randall

Inventor
H. N. Wayne
by A. W. Rowley
atty.

(No Model.) 2 Sheets—Sheet 2.

H. N. WAYNE.
ENDLESS TUBULAR FABRIC.

No. 552,940. Patented Jan. 14, 1896.

UNITED STATES PATENT OFFICE.

HERBERT N. WAYNE, OF NEWTON, MASSACHUSETTS, ASSIGNOR OF ONE-THIRD TO EDWIN R. RAND, OF SAME PLACE.

ENDLESS TUBULAR FABRIC.

SPECIFICATION forming part of Letters Patent No. 552,940, dated January 14, 1896.

Application filed January 2, 1895. Serial No. 533,682. (No model.)

*To all whom it may concern:*

Be it known that I, HERBERT N. WAYNE, of Newton, in the county of Middlesex and State of Massachusetts, have invented certain new and useful Improvements in Endless Tubular Fabrics, of which the following is a specification.

This invention has relation to fabrics suitable for use in the construction of cushion or pneumatic tires for bicycles and other vehicles and for similar purposes.

It is the object of the invention to produce a fabric for the uses mentioned, and for any other to which it may be found applicable, which shall be endless and without cross-seam or splice or any equivalent feature to render it weak and uneven at points.

To these ends the invention consists of an endless tubular fabric without cross-seam or splice formed from threads arranged in helices or coils upon a form or support, the component threads of which fabric extend through the structure a plural number of times in a series of helices or coils of comparatively steep pitch with reference to the axis of the tube or support and in opposite directions, an elastic binding substance being in some instances amalgamated with the threads so positioned on the support, though in some instances the fabric may be used on the support without a binding substance, the support serving of itself to maintain the threads of the fabric in place, all as is hereinafter more fully set forth.

Reference is to be had to the annexed drawings, and to the letters marked thereon, forming a part of this specification, the same letters designating the same parts or features, as the case may be, wherever they occur.

Figures 1, 2, 3, 4:
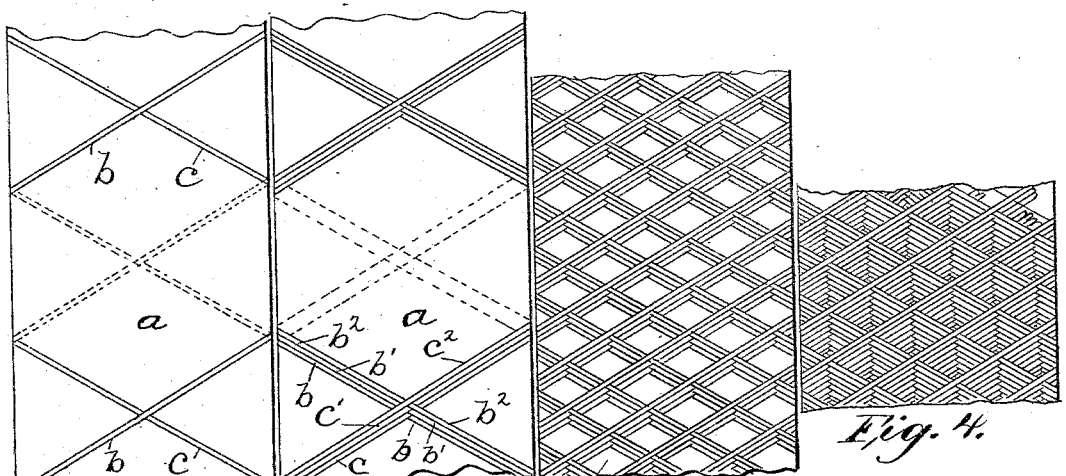
Figure 9:
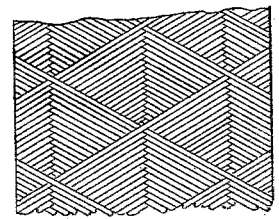
Figure 7:
Figure 5:
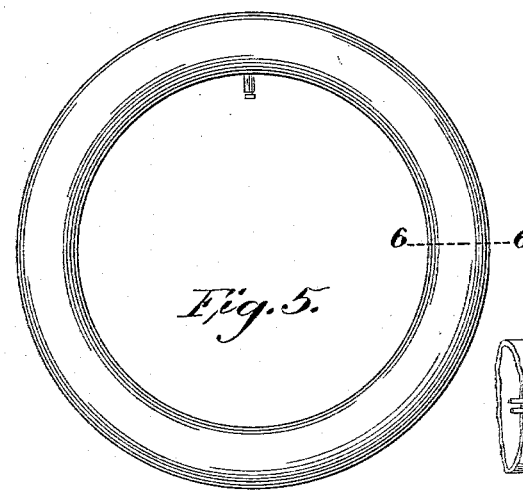
Figure 8:
Figure 6:
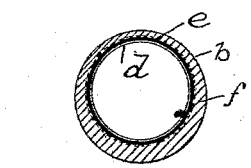
Figure 10:
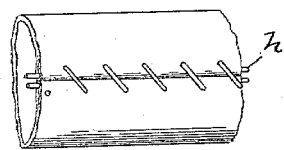
Figure 11:
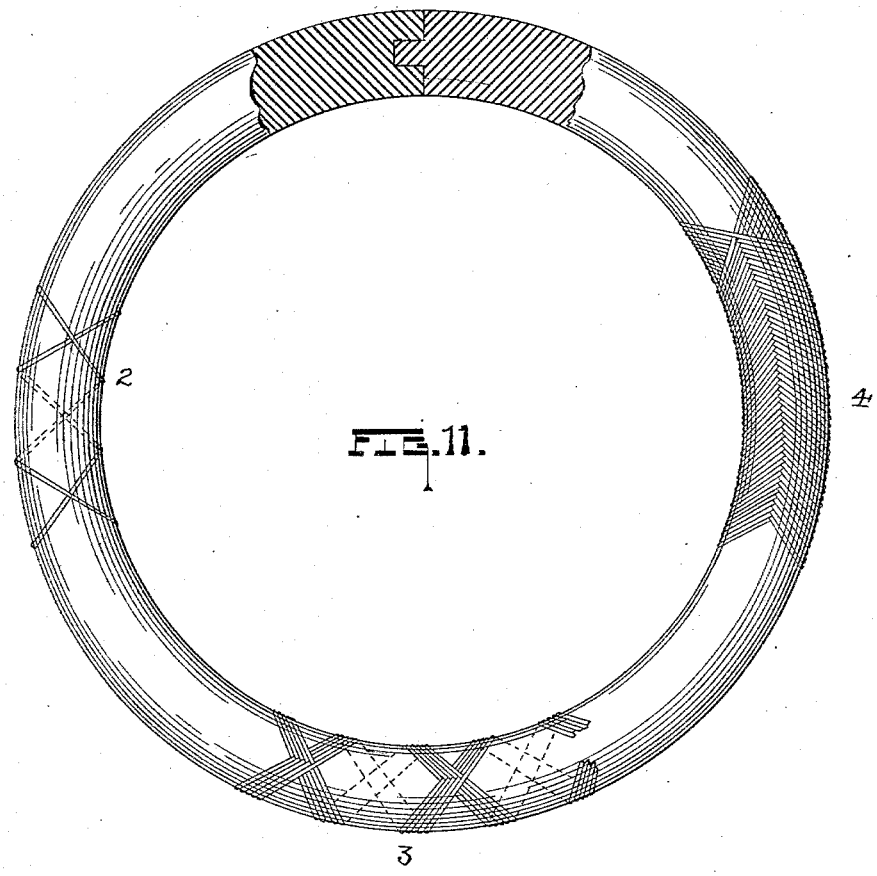

In the drawings, Figure 1 shows what may be considered a part of a circular or ring-like mandrel or form forming a support for the threads composing the fabric, with a pair of threads passing helically or spirally around it, each in a direction opposite to the other. Fig. 2 shows the mandrel or form after the threads have been laid upon it several times. Fig. 3 shows the mandrel or form with the threads of several bobbins laid upon the mandrel or form in helical order and crossed or interlocked at certain points or on certain lines. Fig. 4 shows a portion of the endless fabric in Fig. 3 after it has been completed. Fig. 5 shows a bicycle-tire in which my improved fabric has been incorporated. Fig. 6 is a cross-section through the tire, taken on the line 6 6 of Fig. 5. Fig. 7 is a cross-section of the fabric made upon two endless wires or cords as a part of a form or mandrel, the fabric in this form being especially adapted for use in the manufacture of a bicycle-tire. In this case the wires or cords serve the purpose of supporting the threads of the fabric in proper position. Fig. 8 is a cross-section of the tubular fabric shown in Fig. 7 flattened so as to be double and held in place by the wires or cords at the edges on the rim of a bicycle. The tire in this case may be supposed to be inflated with air and the fabric to be held in place on the tread of the same. Fig. 9 shows the fabric which may be considered as braided instead of wound. Fig. 10 shows the fabric illustrated in Fig. 7 as having its edges laced together to form a tube. Fig. 11 shows a mandrel or form upon which a fabric, formed by passing separate threads around it in opposite directions, is shown in various stages of formation. In this case the threads comprising the fabric are held in place by the support alone.

In producing my improved endless fabric I utilize a ring-like form or mandrel $a$, mounted in any suitable way, upon which I lay the yarn, thread, or wire in coils or helices, having a steep pitch relatively to the axis of the mandrel or form, as I will presently explain. Any number of threads may be used, but for general purposes I may employ two, one being wrapped from left to right around the mandrel and the other being wrapped from right to left.

In Fig. 1 the mandrel $a$ (which may be of rubber or any other flexible substance, split at one or more points to render it jointable and disjointable) is shown as it appears after threads $b$ $c$ have been laid upon it in opposite directions. They may be wrapped thereon by hand, the thread $c$ passing over the mandrel and over again, pursuing a spiral or helical path. The thread $b$ follows a similar path, except that it passes over the mandrel from left to right, and from thence under it, and it crosses and lays upon the thread c at two points every time it passes once around the mandrel.

By reference to what is shown in Figs. 1 and 2 the manner in which the pair of threads cross each other in the first and successive coils or helices around the mandrel will be clearly understood, the successive coils of the thread $b$ being indicated by $b'$ and $b^2$, and the successive coils of the thread $c$ being indicated by $c'$ and $c^2$.

In Fig. 3 I have shown six pairs of threads employed in the formation of the fabric. In this case twelve thread-carrying bobbins may be employed, six running in one direction about the mandrel and the other six in the opposite direction. In the last-mentioned figure it will be understood that the mandrel has made three revolutions and that each thread has been made to form a series of three coils thereon.

In Fig. 4 there is shown a short piece of the fabric represented as begun in Fig. 3 completed—that is, the pairs of threads are pictured as having been wound upon the mandrel in a series of successive helices sufficient to fill the spaces or openings between the first-laid coils.

In Fig. 9 there is represented a piece of my improved fabric in which a less number of pairs of threads were employed than is portrayed in Figs. 3 and 5. In this instance it may be supposed that the threads were first laid around the mandrel in open coils, the succeeding coils filling the spaces or openings therebetween, as before explained, and that in their course around the mandrel they were intertwisted or interlocked, as is done in the movement of threads in the process of braiding. After a fabric has been formed on, say, a flexible jointable and disjointable mandrel, the latter may be separated at a joint and removed through the spread meshes of the fabric at a suitable point, or a slit may be formed in the inner side of the fabric, longitudinal thereof, through which the mandrel may be removed, the slit being subsequently closed in any suitable way.

Before removing the mandrel or form the fabric or a part of it throughout its circumference will have caoutchouc or rubber or other binding substance amalgamated with it, so as to integrate or bind the threads together into a fabric, since unless the threads were locked together, as by the braiding process in being laid on the form, there will be nothing to hold the threads in proper relative position with respect to each other.

In Fig. 11 a mandrel is shown upon which two threads extend in opposite directions to form a fabric, the latter being illustrated as in the process of formation—that is to say, upon one portion of the mandrel, as at 2, I show two threads extending around it in opposite directions, as is also illustrated in Fig. 1; and upon another portion of it, as at 3, I have shown the successive coils of threads lying closely side by side; and upon another portion, as at 4, of said mandrel I have illustrated a section of the fabric as completed—that is, the pairs of threads are shown as having been wound upon the mandrel in a sufficient number of coils to completely fill the openings between the first laid or original coils.

The mandrel may be temporary—that is, of a character permitting it to be removed as aforesaid—or it may form a part of the tire itself. In case the mandrel is made a part of the tire itself or is permanent it may not be necessary to amalgamate a binding substance with the threads to maintain them in proper position, as before stated, since the tire will form a support for that purpose; and in constructing a cushion or pneumatic tire I may therefore form the fabric directly upon a portion of it. In such a case, and in case a binding substance is to be incorporated with the threads of the fabric, the following steps may be followed: I first form a rubber tube $d$ of stiff good quality stock, secure the valve in place, and cover the tube with a layer of pure gum $e$, securing or joining the ends. Then the tube is inflated, and the threads $b$ $c$ are wound or braided upon it until it is covered with as many layers as is desired. It is then coated with cement, and then the tread or sheath $f$ is secured in place, and this whole tire vulcanized in a suitable mold. For some purposes the threads may be laid upon a flat or oval mandrel $m$, (see Fig. 7,) having a groove $g$ at each edge for the reception of ring-like wires or cords $h$, which may be first laid in the grooves before the yarn or threads are laid thereon. The threads or yarn may be wound upon the wires, leaving out the thread $c$, so that the parts of the coils upon the upper side of the mandrel or form will all pass in the same direction, and the parts of the coils on the under side of the mandrel will cross the said upper part of the coils in the other direction; and when the fabric has been completed and the mandrel has been removed the wires $h$ $h$ will remain in the edges of the fabric, which latter will perforce be flat and endless. Such a fabric is especially adapted for use as a bicycle-tread, as shown in Fig. 8, in which the wires $h$ are illustrated as lying in grooves in the rim of the wheel and holding the tire in place. It may also have its edges brought together and connected by lacings, as shown in Fig. 10, to form a tube.

Having thus explained the nature of the invention and described a way of constructing and using the same, though without attempting to set forth all of the forms in which it may be made or all of the modes of its use, it is declared that what is claimed is—

1. An endless tubular fabric without cross seam or splice formed from threads arranged in coils or helices, the component threads extending through the structure a plural number of times in a series of helices or coils of comparatively steep pitch relatively to the axis of the tube and in opposite directions, and an elastic binding substance amalgamated with the threads so positioned and related, all as hereinbefore set forth.

2. In combination with a cushion for a vehicle tire an endless tubular fabric without cross seam or splice formed thereon from threads arranged in coils or helices, the component threads of the fabric extending through the structure a plural number of times in a series of helices or coils of comparatively steep pitch, relatively to the axis of the tubular structure, and in opposite directions, and an elastic binding substance amalgamated with the threads so positioned and related, as hereinbefore set forth.

In testimony whereof I have signed my name to this specification, in the presence of two subscribing witnesses, this 26th day of December, A. D. 1894.

HERBERT N. WAYNE.

Witnesses:
M. B. MAY,
WM. A. MACLEOD.